United States Patent [19]

McDowell et al.

[11] 3,980,627

[45] Sept. 14, 1976

[54] ANAEROBIC SEALANT COMPOSITION AND METHOD OF PREPARATION

[75] Inventors: Donald J. McDowell, Riverside; Purshottam S. Patel, Elk Grove Village, both of Ill.

[73] Assignee: Felt Products Mfg. Co., Skokie, Ill.

[22] Filed: Apr. 17, 1975

[21] Appl. No.: 568,990

[52] U.S. Cl. ............................ 526/328; 526/222; 526/217; 526/229
[51] Int. Cl.² ............... C08F 218/00; C08F 220/00; C08F 120/02; C08F 222/00
[58] Field of Search ............... 260/89.5 R, 89.5 A, 260/86.1 E

[56] References Cited
UNITED STATES PATENTS

| | | | |
|---|---|---|---|
| 3,043,820 | 7/1962 | Krieble | 260/89.5 R |
| 3,180,777 | 8/1965 | Karo | 260/89.5 R |
| 3,203,941 | 8/1965 | Krieble | 260/89.5 R |
| 3,218,305 | 11/1965 | Krieble | 260/89.5 R |
| 3,300,547 | 1/1967 | Gorman et al. | 260/89.5 R |
| 3,419,512 | 12/1968 | Lees et al. | 260/89.5 R |
| 3,454,543 | 7/1969 | Rai et al. | 260/89.5 R |
| 3,591,438 | 7/1971 | Toback et al. | 260/89.5 R |
| 3,775,385 | 11/1973 | Ozono et al. | 260/89.5 A |

*Primary Examiner*—Joseph L. Schofer
*Assistant Examiner*—Herbert J. Lilling
*Attorney, Agent, or Firm*—Dressler, Goldsmith, Clement, Gordon & Shore, Ltd.

[57] ABSTRACT

An anaerobic sealant composition capable of polymerizing upon exclusion of air comprises (1) a polyacrylic ester monomer, (2) an inorganic salt initiator which can be a persulfate or a perchlorate of ammonium, alkali metal or an alkaline earth metal, (3) an accelerator which can be a N,N-di(lower alkyl) amide of a monocarboxylic aliphatic acid, an organic carboximide of a polycarboxylic acid, or an organic sulfimide of a carboxylic acid, and (4) a quinone-type polymerization inhibitor. The composition is prepared by compounding the aforementioned ingredients and suitably aging the resulting formulation.

41 Claims, No Drawings

ANAEROBIC SEALANT COMPOSITION AND METHOD OF PREPARATION

BACKGROUND OF THE INVENTION

This invention relates to a liquid monomeric composition which has anaerobic curing characteristics, that is, a composition which undergoes spontaneous polymerization to a solid state in the absence of air or substantial amounts of oxygen.

Sealant compositions of this general type have been formulated for bonding closely facing metal surfaces such as threaded joints, for joining nuts to bolts without lock washers, gears to shafts for rotation therewith, and the like. Such compositions are precatalyzed or prereacted monomeric compositions the curing of which is inhibited by oxygen. While such compositions are stored in partially empty containers or air-permeable plastic containers, sufficient amounts of oxygen continuously contact the anaerobic composition to maintain the composition in an uncured, liquid state. However, when an anaerobic composition of this general type is placed between surfaces to be bonded or sealed and atmospheric oxygen, i.e., air, is effectively excluded, polymerization or cure of the composition commences within a relatively short time period and the composition will set to a solid state. The polymerization in the absence of air is accelerated by contact with active metals.

Anaerobic compositions generally are composed of polymerizable acrylic ester monomers and peroxide and other polymerization initiators therefor together with amine, amide or imide latent polymerization accelerators which do not initiate polymerization but only accelerate the polymerization reaction once it has begun. In order to prevent premature polymerization of the monomer it has been common practice to incorporate within the anaerobic compositions a small amount of a quinone-type stabilizer which inhibits free radical polymerization. Illustrative prior art anaerobic compositions are disclosed in U.S. Pat. Nos. 2,895,950; 3,041,322; 3,043,820; 3,046,262; 3,203,941; 3,218,305; 3,300,547; 3,720,656; and others.

SUMMARY OF THE INVENTION

The present invention contemplates an improved anaerobic composition which utilizes certain inorganic salts as polymerization initiators for a polyacrylic ester monomer. These compositions are especially effective when used in combination with an accelerator which is a member of the group consisting of a N,N-di(lower alkyl) amide of a monocarboxylic aliphatic acid, an organic carboximide of a polycarboxylic acid, and an organic sulfimide of a carboxylic acid. A particularly effective accelerator for the purposes of this invention comprises the combination of the N,N-di(lower alkyl)amide of a monocarboxylic aliphatic acid and an organic sulfimide, for example, the combination of N,N-dimethyl formamide and benzoic sulfimide which combination exhibits a synergistic effect as an accelerator. Additionally, a quinone-type polymerization inhibitor is present in the composition in an amount sufficient to retard polymerization of the aforesaid monomer during storage of the composition in the presence of air.

DESCRIPTION OF THE PREFERRED EMBODIMENTS

The polyacrylic ester monomers suitable for use in compounding the present anaerobic sealant compositions can be represented by the general formula

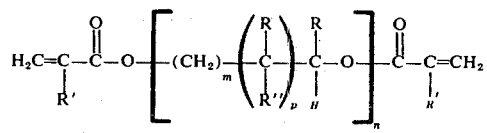

wherein R is a member of the group consisting of hydrogen, alkyl containing 1 to 4 carbon atoms, inclusive, hydroxyalkyl containing 1 to 4 carbon atoms, inclusive, and

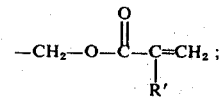

R' is a member of the group consisting of hydrogen, halogen, and alkyl containing 1 to 4 carbon atoms, inclusive; R'' is a member of the group consisting of hydrogen, alkyl containing 1 to 4 carbon atoms, inclusive, hydroxy, and

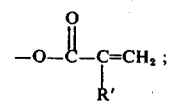

m is an integer having a value of at least 1; n is an integer having a value of at least 1; and p is an integer having a value of 0 or 1.

Typical illustrative monomers within the purview of the foregoing general formula are triethylene glycol dimethacrylate, ethylene glycol dimethacrylate, tetraethylene glycol dimethacrylate, polyethylene glycol dimethacrylate, 1,3-butylene glycol dimethacrylate, trimethylol propane trimethacrylate, neopentyl glycol dimethacrylate, and the like. These monomers need not be in the pure state for the purposes of the present compositions but may comprise commercial grade materials in which polymerization inhibitors or stabilizers such as hydroquinone, benzoquinone, methyl ether hydroquinone, or the like are present.

Moreover, the monomer portion of the present compositions can also contain some free acid such as acrylic acid, methacrylic acid, or the like, so that the acid number of the monomeric constituent is greater than zero. Preferably the acid number of the monomeric constituent in the sealant compositions of this invention is about 0.005 to about 0.05.

The inorganic salt initiator must be present in the anaerobic sealant composition in an amount sufficient to initiate polymerization of the monomer between two surfaces to be joined or bonded upon the exclusion of air, i.e., in the absence of a substantial amount of oxygen. The inorganic salt initiators in this invention are the persulfates or perchlorates of ammonium, an alkali metal, or an alkaline earth metal. Illustrative inorganic salt initiators are ammonium persulfate, ammonium perchlorate, sodium persulfate, sodium perchlorate, potassium persulfate, potassium perchlorate, lithium perchlorate, calcium perchlorate, and magnesium perchlorate. While some of the inorganic salt initiators contemplated herein are only sparingly soluble in the monomer, in compounding the present liquid formulations the initiator can be introduced in a finely divided or powdered form and in an excess quantity, and the undissolved and/or un-reacted excess subsequently filtered out. Alternatively, the initiator can be first dissolved in the accelerator and then combined with the monomer, or an auxiliary solvent, chemically inert with respect to the formulation components, can be utilized, if desired. Illustrative of such auxiliary solvents are tetrahydrofuran, alcohols, cellosolve acetate, and the like. Auxiliary solvents that can be oxidized to organic peroxides should be avoided.

The aforementioned inorganic salt initiators are ionic substances and are further characterized by the fact that the non-oxygen component of the anion in each case have an atomic oxidation state of +7 as defined in Mahn, *Textbook of University Chemistry*, pp. 223 et seq., Addison-Wesley Pub. Co. (1965).

The specific amount of inorganic salt initiator utilized in a given anaerobic sealant formulation will vary depending on the particular initiator, monomer, and accelerator or accelerators that are used. Preferably the amount of initiator used in forming the anaerobic sealant formulations of this invention can be about 0.005 to about 15 parts by weight per 100 parts by weight of the monomer. The amount of initiator used includes the amount of initiator present as such in the final product plus any amount of initiator that may have entered into chemical reaction with other components present. Analysis of the prepared anaerobic compositions for the cation element of the initiator indicate that the cation element is usually present in a less than stoichiometric amount relative to the non-oxygen element of the anion. In compounding the present formulations it is preferable to initially add an excess of the inorganic salt initiator and subsequently remove any undissolved solids after the formulation has been aged. During compounding the inorganic salt initiator can be added to the formulation in an amount of up to about 20 parts by weight per 100 parts by weight of the monomer, preferably about 1 to about 20 parts by weight per 100 parts by weight of the monomer.

The polymerization accelerator to be used in conjunction with the foregoing inorganic salt initiators can be a N,N-di(lower alkyl)amide of a monocarboxylic aliphatic acid, an organic carboximide of a polycarboxylic acid, or an organic sulfimide of a carboxylic acid, present in an amount sufficient to accelerate polymerization of the monomer in the absence of air.

Illustrative N,N-di(lower alkyl)carboxamides are N,N-dimethyl formamide, N,N-diethyl formamide, N,N-dibutylformamide, N,N-dimethyl acetamide, N,N-diethyl propionamide, and the like.

The amide-type accelerator can be present in the formulation in an amount of about 0.5 to about 40 parts by weight per 100 parts of the monomer, and preferably in an amount of about 5 to about 20 parts by weight per 100 parts by weight of the monomer. In general, the greater the amount of amide-type accelerator present in the sealant composition, the faster the rate of set; however, the ultimate break-away strength is decreased.

Illustrative organic carboximides of a polycarboxylic acid are those having the general formula

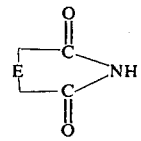

wherein E represents an aromatic or an aliphatic chain nucleus derived from a polycarboxylic acid. Illustrative carboximide accelerators are succinimide, maleimide, malonimide, glutarimide, cyclohexyldicarboximide, phthalimide, 1,2,4-benzenetricarboximide, naphthalimide, the metal salts thereof, and the like.

The carboximide-type accelerator can be present in the formulation in an amount of about 0.25 to about 2 parts by weight per 100 parts by weight of the monomer, and preferably in an amount of about 0.5 to about 2 parts by weight per 100 parts by weight of the monomer.

Illustrative organic sulfimides of a polycarboxylic acid are represented by the general formula

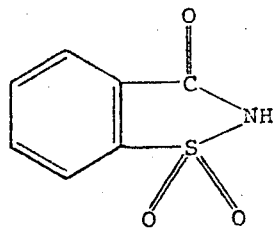

Illustrative sulfimides are benzoic sulfimide, sodium salt of benzoic sulfimide, and the like.

The sulfimide-type accelerator can be present in the formulation in an amount of about 0.25 to about 2 parts by weight per 100 parts by weight of the monomer, and preferably about 0.5 to about 2 parts by weight per 100 parts by weight of the monomer.

As pointed out hereinabove, a small amount of stabilizer, such as a quninone-type stabilizer usually is present in the commercial grades of the polyacrylic ester monomers suitable for the present sealant compositions. However, the present sealant compositions must contain a sufficient amount of a suitable stabilizer to retard polymerization of the monomer during storage of the sealant composition in the presence of air. By the term "quinone-type stabilizer" as used herein and in the claims is meant quinone and its derivatives such as the benzoquinones, the naphthoquinones, the hydroquinones, and the like. Illustrative quinone-type stabilizers are 1,4-benzoquinone, 2,5-dihydroxy benzoquinone, 2,5-diphenyl-p-benzoquinone, 1,2-naphthoquinone, 9,10-anthraquinone, methyl ether hydroquinone, tetrachloro-p-benzoquinone, 2,3-dichloro-1,4-naphthoquinone, and the like.

The amount of quinone-type stabilizer in the present anaerobic sealant compositions can vary depending on the nature of the accelerator that is used. In general, the greater the activity of the accelerator, the more stabilizer should be present in the formulation. When a quinone-type stabilizer is present, it is usually present in an amount of about 50 to about 200 parts by weight per one million parts by weight of the monomer (p.p.m.), or more. Preferably about 75 p.p.m. to about 150 p.p.m. of the hydroquinone or methyl ether hydroquinone types are present.

Additionally, small amounts of an aqueous additive such as water or an aqueous solution of an inorganic alkali metal salt of a strong acid can be used to modify or enhance the time of set and/or bond strength for the present formulations. Thus, particularly when a sulfimide accelerator having a relatively slow set time is used in the sealant formulation, it is advantageous to incorporate therein up to about two weight-percent, based on the weight of the formulation of an aqueous 10 wt.-% saline solution or water. When only water is incorporated into the formulation, preferably the amount thereof is about 0.25 to about 1 weight percent.

Further advantages are gained by utilizing in the present formulations a combination of accelerators together with the inorganic salt initiator. Usually, the weight ratio of an amide-type accelerator to a sulfimide-type accelerator is about 160:1 to about 1:4, respectively. It has also been found that a synergistic effect with respect to formulation set time is obtained when an amide-type accelerator is combined with the sulfimide-type accelerator in a weight ratio of about 50:1 to about 1:1, respectively. A preferred synergistic accelerator is a combination of N,N-dimethyl formamide and benzoic sulfimide in a respective weight ratio of about 10:1.

For optimum performance of the anaerobic sealant compositions the weight ratio of the accelerator to the initiator in any given instance is also a factor. The overall accelerator-to-initiator weight ratio can be about 8400:1 to about 1:60, respectively. Where the accelerator is a N,N-di(lower alkyl) carboxamide, the accelerator-to-initiator weight ratio is about 8000:1 to about 1:30, respectively. In instances where the accelerator is a sulfonimide or carboximide the accelerator-to-initiator weight ratio is about 400:1 to about 1:60, respectively. However, where a mixture of a N,N-di(lower alkyl)carboxamide and a sulfonimide is used as the accelerator, the accelerator-to-initiator ratio can be about 8400:1 to about 1:20, respectively.

Depending on the intended end use of the sealant compositions, the viscosity thereof can vary. A liquid composition of relatively low viscosity and good surface tension which enhances capillary action is desirable for joining closely fitting surfaces or for sealing pre-assembled parts by sealant penetration between the mating surfaces. On the other hand, where relatively loosely fitting surfaces are to be joined or void spaces are to be filled, compositions having a relatively high viscosity or thixotropic properties are preferred. In general, the sealant compositions can have a viscosity in the range of about 10 to about 2000 centipoises as determined at room temperature using a Brookfield viscometer at 5 revolutions per minute and fitted with spindle No. RV No. 1.

The viscosity characteristics of the sealant composition can be adjusted to the desired value by using a variety of inert thickeners such as fumed or colloidal silica, polymethylmethacrylate, polyacrylic rubber, cellulose acetate butyrate and the like. Also suitable are reactive thickening agents such as polyvinyl chloride, chlorinated rubber, and the like.

The anaerobic sealant compositions are compounded by first admixing predetermined amounts of the polyacrylate ester monomer and the inorganic salt initiator. Thereafter the accelerator is added, and the resulting admixture is aged until anaerobic properties are developed. If desired, a portion of the inorganic salt initiator to be added to the composition can be first dissolved in the accelerator and then added to the monomer as a solution.

Aging of the prepared admixture can be carried out at room temperature or above. The necessary aging period depends to some extent on the aging temperature since anaerobic properties are developed in the formulation within a relatively shorter time period at elevated temperatures. Aging temperatures up to about 200°F. are suitable. At ambient temperature the compounded formulations preferably are aged for at least about 2 days. At elevated temperatures, for example, at about 120°F., the formulations preferably are aged about 1 day. After aging, any solid materials present in the produced anaerobic composition are filtered out or otherwise removed, e.g., by centrifuging and decanting the composition.

The efficacy of the anaerobic sealant composition can be evaluated by several tests.

The shelf life of an anaerobic sealant composition is ascertained by maintaining the composition in a low-density, air-permeable polyethylene bottle at a temperature of 178°±2°F. and checking the formulation for onset of polymerization (gelation) at 30-minute intervals. A sealant composition free from gelation after 30 minutes at 178°±2°F. will usually have a shelf life under normal storage conditions for at least one year.

An alternate half life test comprises storing of the composition in a low-density polyethylene bottle at 120°±3°F. for a time period of 10 days and checking for gelation. If no gelation is observed under these storage conditions after 10 days, the composition will usually have a shelf life under normal storage conditions for at least 1 year.

Set time and ultimate strength for a sealant composition is ascertained by a "finger-tight" test and a locking torque test. These tests are performed by applying a few drops of the sealant composition to the exposed threads of a degreased ⅜-inch unoxidized steel bolt having 24 threads per inch (Unified Fine Thread Series, Class 2 fit) fitted with a degreased ⅜-inch nut (FF-N-836). Both the bolt and the nut are degreased in 1,1,1-trichloroethane. The nut is unscrewed over the wetted threads until the end of the nut is flush with the end of the bolt and then screwed back on until about ⅛ to 3/16-inch of the bolt protrudes through the nut. In this manner complete coverage of the engaged metal area by the sealant composition is assured.

A bolt treated in the foregoing manner is then placed head down on a level surface and allowed to stand. From time to time the nut and bolt are checked to ascertain whether or not the sealant has set to a degree where the nut is finger-tight on the bolt, i.e., whether the nut still can be manually turned relative to the bolt without the aid of a wrench or a similar tool. The time period necessary to reach a finger-tight set is noted and recorded as set time.

About 24 hours after the nut and bolt have reached a finger-tight set the bolt head is clamped in a vise with the bolt shank disposed vertically. A torque wrench is applied to the nut and the torques required to dislodge the nut (break-away torque) and to turn the nut after dislodging (runaway torque) are determined. Runaway torque is recorded as the average torque necessary to turn the nut at one-quarter, one-half, three-quarters, and one full turn after the nut has been dislodged by application of the break-loose torque.

Commercially preferred anaerobic sealant compositions are those exhibiting a set time to a finger-tight condition of less than about 24 hours, and a value for break-away torque or runaway of 5 inch-pounds or greater.

The present invention is further illustrated by the following examples.

admixed with the monomer, the co-accelerators were then added, and the resulting admixture was aged about 1 week at room temperature. Thereafter the aged composition was filtered and tested for set time, break-away torque, and runaway torque. The produced compositions and the test results thereof are compiled in Table II, below.

TABLE II

| Initiator | Co-Accelerators (pts. by wt.)[3] | | Set time, | Torque, in.-lbs. | |
|---|---|---|---|---|---|
| (pts. by wt.)[3] | DMF[1] | BS[2] | hrs:min | Breakaway | Runaway |
| $KClO_4$ (.55) | 20 | 0.5 | 0:10 | 18 | 20 |
| $K_2S_2O_8$(.217) | 20 | 0.8 | 0:50 | 24 | 24 |
| $Na_2S_2O_8$(.52) | 20 | 0.8 | 0:25 | 24 | 42 |
| $NaClO_4H_2O$(5.0) | 20 | 0.5 | 72:00 | 12 | 12 |

[1]DMF - dimethyl formamide
[2]BS - benzoic sulfimide
[3]per 100 parts by weight of the monomer

EXAMPLE 1

Anaerobic Sealant Composition Containing Potassium Persulfate, Dimethyl Formamide and Benzoic Sulfimide Sealant compositions were compounded using the ingredients set forth in Table I, below, aged at about 180°F. for about 15 hours and then tested for set time to finger-tight condition.

TABLE I

| Ingredient | Formulation grams of ingredient | | | |
|---|---|---|---|---|
| | A | B | C | D |
| Tetraethylene Glycol Dimethacrylate | 50 | 50 | 50 | 50 |
| Potassium Persulfate | 1.5 | 1.5 | 1.5 | 1.5 |
| Dimethyl Formamide | — | 10.0 | — | 10.0 |
| Benzoic Sulfimide | — | — | 0.4 | 0.4 |

No set was observed within 24 hours for Formulation A, the set time for Formulation B was found to be 2 hours, a partial set was observed for Formulation C after 24 hours (no set after 4 hours), but Formulation D had a set time of 0.167 hours. The foregoing data show that a synergistic accelerating effect is obtained when a combination of dimethyl formamide and benzoic sulfimide is used in a respective weight ratio of about 25 to 1 as an accelerator for potassium persulfate-initiated polymerization.

EXAMPLE 2

Anaerobic Sealant Composition Containing Tetraethylene Glycol Dimethacrylate, Inorganic Salt Initiator and Co-Accelerators Sealant compositions were compounded using tetraethylene glycol dimethacrylate monomer (100 parts by weight), stabilizer (hydroquinone, 90 parts per million parts of monomer), various inorganic salt initiators, and as co-accelerators dimethyl formamide (20 parts by weight), and varying amounts of benzoic sulfimide. During compounding the inorganic salt initiator was admixed with the monomer, the co-accelerators were then added, and the resulting admixture was aged about 1 week at room temperature. Thereafter the aged composition was filtered and tested for set time, break-away torque, and runaway torque. The produced compositions and the test results thereof are compiled in Table II, below.

The foregoing data demonstrate the anaerobic properties of the compositions embodying this invention.

EXAMPLE 3

Anaerobic Sealant Composition With Water or Aqueous Sodium Chloride Solution as an Additive Compositions were prepared by admixing tetraethylene glycol dimethacrylate monomer (100 parts by weight), varying the type of an inorganic salt initiator, dimethyl formamide (20 parts by weight), varying amounts of benzoic sulfimide and an additive. The monomer employed contained about 90 parts per million of hydroquinone as a stabilizer. The various ingredients were compounded as follows:

A. Preparations Containing Dimethyl Formamide and Benzoic Sulfimide as Accelerators and Water or Saline Solution as Optional Additives An aliquot of tetraethylene glycol dimethacrylate (100 parts by weight), containing about 90 p.p.m. of hydroquinone, was weighed and placed in an air-permeable polyethylene bottle, and 10 parts by weight of initiator was added thereto. Thereafter dimethyl formamide (20 parts by weight) was added to the produced admixture, and the bottle was capped and shaken vigorously for 10 minutes every day for 10 days. The bottle contents were then centrifuged to separate out solids. After centrifugation, the obtained liquid portion was decanted and retained.

Benzoic sulfimide was then added to aliquots of the retained liquid portion together with any other desired additives. The resulting solutions were aged for 7 days at room temperature, and the aged solutions subsequently checked for stability at 120°F. for 10 days, and tested for set time, break-away torque, and runaway torque.

The liquid portion decanted after centrifugation was analyzed for the amount of the non-oxygen element of the initiator anion present. The amount of initiator introduced into the composition was then calculated on the basis of the analysis. The prepared compositions and the obtained test results are presented in Table IIIA, below.

TABLE IIIA

| Initiator (pts. by wt.)[3] | Benzoic Sulfimide (pts. by wt.)[3] | Additive | Set time, hrs:min | Torque,in.-lbs. | | Stability |
|---|---|---|---|---|---|---|
| | | | | Break-away | Run-away | |
| $K_2S_2O_8$ (.217) | — | none | 1:00 | 96 | 90 | good |
| | — | 1 wt.-% $H_2O$ | 1:10 | 36 | 74 | good |
| | — | 1 wt.-% aq. NaCl[5] | 0:50 | 36 | 96 | fair[4] |

TABLE IIIA-continued

| Initiator (pts. by wt.)[3] | Benzoic Sulfimide (pts. by wt.)[3] | Additive | Set time, hrs:min | Torque, in.-lbs. Break-away | Run-away | Stability |
|---|---|---|---|---|---|---|
| | — | 1 wt.-% aq. H$_3$PO$_4$ | none | — | — | good |
| KClO$_4$ (.55) | — | none | 1:15 | 24 | 24 | good |
| | — | 2 wt.-% aq. NaCl[5] | 0:15 | 72 | 66 | good |
| | — | 1 wt.-% H$_2$O | 0:45 | 36 | 42 | good |
| | 0.5 | none | 0:10 | 18 | 20 | good |
| | 0.5 | 1 wt.-% H$_2$O | 0:33 | 48 | 96 | good |
| | 0.5 | 1 wt.-% aq. NaCl[5] | 0:30 | 36 | 54 | fair[4] |
| K$_2$S$_2$O$_8$ (.217) | 0.8 | none | 0:50 | 24 | 24 | good |
| | 0.8 | 1 wt.-% H$_2$O | 1:30 | 12 | 12 | good |
| | 0.8 | 1 wt.-% aq. NaCl[5] | 72:00 | 12 | 6 | fair[4] |

[3]per 100 parts by weight of the monomer
[4]partial gelling was observed
[5]aqueous 10 wt.-% saline solution

B. Preparations Containing Benzoic Sulfimide as Accelerator and Water or Saline Solution as Optional Additives An aliquot of tetraethylene glycol dimethacrylate (100 parts by weight), containing hydroquinone stabilizer (about 90 p.p.m.), was weighed and placed in an air-permeable polyethylene bottle, and 10 parts by weight of initiator was added thereto together with varying amounts of benzoic sulfimide. The bottle was then capped and shaken vigorously for 10 minutes. After shaking, the bottle was stored for 10 weeks at room temperature to age the contents thereof.

After aging, the bottle contents were centrifuged to separate out solids, and the obtained liquid portion was decanted and saved. The desired additives were then added to aliquots of the aged liquid and the resulting solutions were aged for 7 days at room temperature. Subsequently the aged solutions were checked for stability at 120°F. for 10 days, and tested for set time, break-away torque, and runaway torque.

Prior to introduction of the additives the decanted liquid portion was analyzed to ascertain the amount of the non-oxygen element of the initiator anion present. The amount of initiator introduced into the composition was then calculated on the basis of the analysis. The prepared compositions and the obtained test results are presented in Table IIIB, below.

TABLE IIIB

| Initiator (pts. by wt.)[3] | Benzoic Sulfimide (pts. by wt.)[3] | Additive | Set time, hrs:min | Torque, in.-lbs. Break-away | Run-away | Stability |
|---|---|---|---|---|---|---|
| KClO$_4$ (.55) | 0.5 | none | 1:00 | 186 | 178 | good |
| | 0.5 | 1 wt.-% H$_2$O | 0:15 | 144 | 150 | good |
| | 0.5 | 1 wt.-% NaCl sol'n[5] | 0:15 | 120 | 261 | good |
| | 2 | none | 1:30 | 192 | 216 | good |
| | 2 | 1 wt.-% H$_2$O | 0:10 | 120 | 243 | good |
| | 2 | 1 wt.-% NaCl sol'n[5] | 0:30 | 12 | 18 | good |
| K$_2$S$_2$O$_8$(.217) | 0.8 | none | partial set | — | — | good |
| | 0.8 | 1 wt.-% H$_2$O | 0:15 | 24 | 21 | good |
| | 0.8 | 1 wt.-% NaCl sol'n[5] | 72:00 | 12 | 6 | good |

[3]per 100 parts by weight of monomer
[5]aqueous 10 wt.-% saline solution

The above data show that water or an aqueous sodium chloride solution can be utilized as an additive to modify the set time and torque characteristics of a particular sealant composition of this invention. The particular effect obtained in each instance is dependent on the type of inorganic salt initiator that is present.

EXAMPLE 4

Anaerobic Sealant Composition with Ammonium Persulfate as Initiator

Compositions were formulated by adding to tetraethylene glycol dimethacrylate monomer (100 parts by weight) dimethyl formamide (20 parts by weight), ammonium persulfate as initiator and varying amounts of hydroquinone as inhibitor. The resulting admixture was blended and then aged for 7 days. After aging the liquid portion of the produced formulation was decanted and tested for set time, torque, and stability at 120°F. for 10 days. The test results are shown in Table IV, below.

TABLE IV

| Initiator, parts by wt.[3] | Inhibitor, p.p.m. | Set time, hrs:min. | Torque, in-lbs Break-away | Run-away | Stability |
|---|---|---|---|---|---|
| 1.5 | 90 | 1:30 | 12 | 12 | fair[6] |
| 1.5 | 130 | 2:00[7] | — | — | good |
| 1.5 | 190 | 2:00[7] | — | — | good |
| 1.5 | 250 | No set | — | — | good |

[3]per 100 parts by weight of monomer
[6]gelled after 48 hours
[7]partial set

EXAMPLE 5

Anaerobic Sealant Composition with Ammonium Perchlorate as Initiator

To 100 parts by weight of tetraethylene glycol dimethacrylate monomer was added ammonium perchlorate (10 parts by weight), dimethyl formamide (0.5 parts by weight), benzoic sulfimide (0.5 parts by weight) and hydroquinone (69 p.p.m.). The resulting admixture was then blended and the obtained blend aged for varying time periods. After aging, the liquid portion of the produced formulation was decanted and tested for set time, torque and stability. The results are presented in Table V, below.

TABLE V

| Aging time, days | Set time, hrs:min | Torque, in-lbs | | Stability |
| | | Break-away | Run-away | |
| --- | --- | --- | --- | --- |
| 3 | 1:00 | 9 | 9 | |
| 10 | 3:00 | 96 | 114 | |
| 13 | 1:00 | 240 | 219 | good |

The foregoing data show the improved torque characteristics obtainable upon aging of the produced formulations.

EXAMPLE 6

Anaerobic Sealant Composition Containing Ammonium Perchlorate and Dimethyl Formamide A blend of tetraethylene glycol dimethacrylate monomer (100 parts by weight), ammonium perchlorate, dimethyl formamide, and hydroquinone inhibitor (69 p.p.m.) was prepared and aged for 3 days. Thereafter the liquid portion of the blend was decanted and tested for set time and torque. The test results are shown in Table VI, below.

TABLE VI

| Initiator, parts by wt.[3] | DMF,[1] parts by wt.[3] | Set time, hrs:min | Torque, in-lbs | |
| | | | Break-away | Run-away |
| --- | --- | --- | --- | --- |
| 2 | 10 | 5-18 | 60 | 36 |
| 2 | 20 | 5-18 | 24 | 15 |
| 5 | 5 | 5:00 | 24 | 23 |
| 5 | 20 | 4:00 | 96 | 99 |
| 10 | 5 | 5-18 | 24 | 12 |
| 10 | 40 | 5-18 | 24 | 24 |

[1]Dimethyl formamide
[3]per 100 parts by weight of monomer

EXAMPLE 7

Anaerobic Sealant Compositions Made with Trimethylol Propane Trimethacrylate Monomer Trimethylol propane trimethacrylate monomer (100 parts by weight) was blended with various initiators (10 parts by weight) and varying amounts of dimethyl formamide. The produced blends were aged for 7 days, and the liquid portion thereof decanted and tested for set time and torque. The test results are set forth in Table VII, below.

TABLE VII

| Initiator | DMF,[1] parts by wt.[3] | Set time, hrs:min | Torque, in-lbs | |
| | | | Break-away | Run-away |
| --- | --- | --- | --- | --- |
| KClO$_4$ | 1 | 4:00 | 12 | 12 |
| KClO$_4$ | 2 | 3:00 | 12 | 12 |
| KClO$_4$ | 5 | 3:00 | 12 | 12 |
| NH$_4$ClO$_4$ | 1 | 3:00 | 12 | 12 |
| NH$_4$ClO$_4$ | 5 | 3:00 | 6 | 6 |
| K$_2$S$_2$O$_8$ | 1 | 4:00 | 12 | 12 |
| K$_2$S$_2$O$_8$ | 5 | 4:00 | 18 | 18 |
| Na$_2$S$_2$O$_8$ | 1 | 3:55 | 96 | 123 |
| Na$_2$S$_2$O$_8$ | 10 | 4:10 | 24 | 24 |

[1]Dimethyl formamide
[3]per 100 parts by weight of monomer

The foregoing example illustrates the effectiveness of trimethylol propane trimethacrylate monomer in anaerobic sealant formulations containing inorganic salt initiators.

The foregoing specification and the examples are intended as illustrative but are not to be taken as limiting. Still other variations within the spirit and scope of this invention are possible and will readily present themselves to the skilled artisan.

We claim:

1. An anaerobic sealant composition having an extended shelf life in the presence of air and capable of polymerization upon exclusion of air which comprises; a polyacrylic ester monomer represented by the general formula

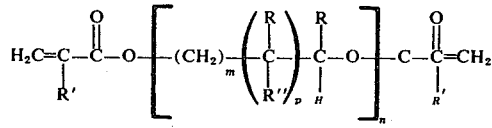

wherein R is a member of the group consisting of hydrogen, alkyl containing 1 to 4 carbon atoms, inclusive, hydroxy alkyl containing 1 to 4 carbon atoms, inclusive, and

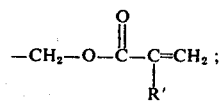

R' is a member of the group consisting of hydrogen, halogen, and alkyl containing 1 to 4 carbon atoms, inclusive; R'' is a member of the group consisting of hydrogen, alkyl containing 1 to 4 carbon atoms, inclusive, hydroxy, and

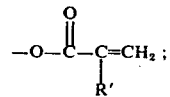

$m$ is an integer having a value of at least 1; $n$ is an integer having a value of at least 1; and $p$ is an integer having a value of 0 or 1;

an inorganic salt which is the sole polymerization initiator which is a member of the group consisting of ammonium perchlorate, alkali metal perchlorate, alkaline earth metal perchlorate, ammonium persulfate, alkali metal persulfate, and alkaline earth metal persulfate, present in an amount sufficient to initiate polymerization of the monomer in the absence of air;

an accelerator present in an amount sufficient to accelerate polymerization of the monomer in the absence of air; and a polymerization inhibitor in an amount sufficient to retrd polymerization of the monomer during storage of the composition in the presence of air.

2. The anaerobic sealant composition in accordance with claim 1 wherein the inorganic salt initiator is in the composition in an amount of about 0.005 to about 15 parts by weight per 100 parts by weight of the polyacrylic ester monomer.

3. The anaerobic sealant composition in accordance with claim 1 wherein the weight ratio of the accelerator to the inorganic salt initiator is about 8400:1 to about 1:60, respectively.

4. The anaerobic sealant composition in accordance with claim 1 wherein the accelerator is an organic N,N- di(lower alkyl)amide of a monocarboxylic aliphatic acid and is present in an amount of about 0.5 to about 40 parts by weight per 100 parts by weight of the polyacrylic ester monomer.

5. The anaerobic sealant composition in accordance with claim 4 wherein the accelerator is N,N-dimethylformamide.

6. The anaerobic sealant composition in accordance with claim 1 wherein the accelerator is an organic carboximide of a polycarboxylic acid and is present in an amount of about 0.25 to about 2 parts by weight per 100 parts by weight of the polyacrylic ester monomer.

7. The anaerobic sealant composition in accordance with claim 1 wherein the accelerator is an organic sulfimide of a polycarboxylic acid and is present in an amount of about 0.25 to about 2 parts by weight per 100 parts by weight of the polyacrylic ester monomer.

8. The anaerobic sealant composition in accordance with claim 7 wherein the accelerator is benzoic sulfimide.

9. The anaerobic sealant composition in accordance with claim 1 wherein the accelerator is N,N-dimethylformamide and benzoic sulfimide in a weight ratio of about 10:1, respectively.

10. The anaerobic sealant composition in accordance with claim 1 wherein the initiator is an alkali metal persulfate.

11. The anaerobic sealant composition in accordance with claim 10 wherein the alkali metal persulfate is potassium persulfate.

12. The anaerobic sealant composition in accordance with claim 10 wherein the alkali metal persulfate is sodium persulfate.

13. The anaerobic sealant composition in accordance with claim 1 wherein the initiator is an alkali metal perchlorate.

14. The anaerobic sealant composition in accordance with claim 13 wherein the alkali metal perchlorate is potassium perchlorate.

15. The anaerobic sealant composition in accordance with claim 13 wherein the alkali metal perchlorate is sodium perchlorate.

16. The anaerobic sealant composition in accordance with claim 1 wherein the inorganic salt initiator is ammonium perchlorate.

17. The anaerobic sealant composition in accordance with claim 1 wherein the inorganic salt initiator is ammonium persulfate.

18. A method for preparing an anaerobic sealant composition which comprises the steps of
forming an admixture of a polyacrylic ester monomer with inorganic salt which is the sole polymerization initiator selected from the group consisting of ammonium perchlorate, alkali metal perchlorate, alkaline earth metal perchlorate, ammonium persulfate, alkali metal persulfate, and alkaline earth metal persulfate, with an accelerator, and with a polymerization inhibitor;
aging the formed admixture for a time period sufficient to develop anaerobic properties; and
removing solids from the aged admixture.

19. The method in accordance with claim 18 wherein an aqueous additive is additionally introduced into said admixture.

20. The method in accordance with claim 18 wherein an additional amount of accelerator is added to the aged admixture.

21. The method in accordance with claim 18 wherein the formed admixture is aged for at least about 2 days at ambient temperature prior to removal of solids.

22. The method in accordance with claim 18 wherein the admixture is formed by blending up to about 20 parts by weight of the inorganic salt initiator and about 1 to about 40 parts by weight of the amide-type accelerator with 100 parts by weight of the polyacrylic ester monomer.

23. The method in accordance with claim 18 wherein the admixture is formed by blending up to about 20 parts by weight of the inorganic salt initiator and about 5 to about 20 parts by weight of amide-type accelerator with 100 parts by weight of the polyacrylic ester monomer.

24. The method in accordance with claim 18 wherein the admixture is formed by blending up to about 20 parts by weight of the inorganic salt initiator and about 0.25 to about 2 parts by weight of sulfimide-type accelerator with 100 parts by weight of the polyacrylic ester monomer.

25. The method in accordance with claim 18 wherein the admixture is formed by blending up to about 20 parts by weight of the inorganic salt initiator, about 0.5 to about 40 parts by weight amide-type accelerator, and about 0.25 to about 2 parts by weight of sulfimide-type accelerator with 100 parts by weight of the polyacrylic ester monomer.

26. The method in accordance with claim 18 wherein the admixture is formed by blending up to about 20 parts by weight of the inorganic salt initiator, about 5 to about 20 parts by weight of amide-type accelerator, and about 0.5 to about 2 parts by weight of sulfimide-type accelerator with 100 parts by weight of the polyacrylic ester monomer.

27. A composition capable of developing anaerobic properties which comprises:
100 parts by weight of a polyacrylic ester monomer represented by the general formula

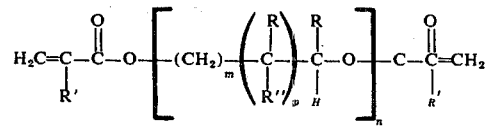

wherein R is a member of the group consisting of hydrogen, alkyl containing 1 to 4 carbon atoms, inclusive, hydroxy alkyl containing 1 to 4 carbon atoms, inclusive, and

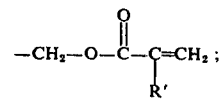

R' is a member of the group consisting of hydrogen, halogen, and alkyl containing 1 to 4 carbon atoms, inclusive; R'' is a member of the group consisting of hydrogen, alkyl containing 1 to 4 carbon atoms, inclusive, hydroxy, and

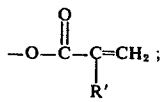

$m$ is an integer having a value of at least 1; $n$ is an integer having a value of at least 1; and $p$ is an integer having a value of 0 or 1;

up to about 20 parts by weight of an inorganic salt which is the sole polymerization initiator which is a member of the group consisting of ammonium perchlorate, alkali metal perchlorate, alkaline earth metal perchlorate, ammonium persulfate, alkali metal persulfate, and alkaline earth metal persulfate, present in an amount sufficient to initiate polymerization of the monomer in the absence of air;

an accelerator present in an amount sufficient to accelerate polymerization of the monomer in the absence of air; and a polymerization inhibitor in an amount sufficient to retard polymerization of the monomer during storage of the composition in the presence of air.

28. The composition in accordance with claim 27 wherein the accelerator is an organic N,N-di(lower alkyl)amide of a monocarboxylic aliphatic acid and is present in an amount of about 0.5 to about 40 parts by weight.

29. The composition in accordance with claim 28 wherein the accelerator is N,N-dimethylformamide.

30. The composition in accordance with claim 27 wherein the accelerator is an organic carboximide of a polycarboxylic acid and is present in an amount of about 0.25 to about 2 parts by weight.

31. The composition in accordance with claim 27 wherein the accelerator is an organic sulfimide of a polycarboxylic acid and is present in an amount of about 0.25 to about 2 parts by weight.

32. The composition in accordance with claim 31 wherein the accelerator is benzoic sulfimide.

33. The composition in accordance with claim 27 wherein the accelerator is N,N-dimethylformamide and benzoic sulfimide in a weight ratio of about 10:1, respectively.

34. The composition in accordance with claim 27 wherein the initiator is an alkali metal persulfate.

35. The composition in accordance with claim 34 wherein the alkali metal persulfate is potassium persulfate.

36. The composition in accordance with claim 34 wherein the alkali metal persulfate is sodium persulfate.

37. The composition in accordance with claim 27 wherein the initiator is an alkali metal perchlorate.

38. The composition in accordance with claim 37 wherein the alkali metal perchlorate is potassium perchlorate.

39. The composition in accordance with claim 37 wherein the alkali metal perchlorate is sodium perchlorate.

40. The composition in accordance with claim 27 wherein the inorganic salt initiator is ammonium persulfate.

41. The composition in accordance with claim 27 wherein the inorganic salt initiator is ammonium perchlorate.

* * * * *

UNITED STATES PATENT AND TRADEMARK OFFICE
CERTIFICATE OF CORRECTION

PATENT NO. : 3,980,627
DATED : September 14, 1976
INVENTOR(S) : Donald J. McDowell and Purshottam S. Patel It is certified that error appears in the above-identified patent and that said Letters Patent are hereby corrected as shown below:

Col. 6, line 29, "half life" should be -- shelf life --.

Col. 12, line 9, after "comprises" delete the semicolon (;).

Col. 12, line 56, "retrd" should be -- retard --.

Signed and Sealed this

Thirtieth Day of November 1976

[SEAL]

Attest:

RUTH C. MASON
*Attesting Officer*

C. MARSHALL DANN
*Commissioner of Patents and Trademarks*